Dec. 15, 1964 F. D. WALDHAUER 3,161,868

PCM ENCODER

Filed Oct. 1, 1962 2 Sheets-Sheet 1

INVENTOR
F. D. WALDHAUER
BY Roy M. Porter, Jr.
ATTORNEY

Dec. 15, 1964 F. D. WALDHAUER 3,161,868

PCM ENCODER

Filed Oct. 1, 1962 2 Sheets-Sheet 2

INVENTOR
F. D. WALDHAUER
BY Roy M. Porter, Jr.
ATTORNEY 3,161,868
PCM ENCODER

Frederick D. Waldhauer, Morris Plains, N.J., assignor to Bell Telephone Laboratories, Incorporated, New York, N.Y., a corporation of New York Filed Oct. 1, 1962, Ser. No. 227,271
10 Claims. (Cl. 340—347)

This invention relates to digital information processing systems and, more particularly, to systems for translating signal amplitudes into representative binary code words.

The binary numbering system suggests a particularly convenient method of processing and communicating information. For example, if it is assumed that there are 32 possible "symbols" in a normal written text (the 26 letters plus a space and 5 marks of punctuation), it may easily be shown that each of these 32 symbols might be exclusively represented by a particular group of five binary digits. This follows from the fact that there are 32 different forms in which a group of five "0's" and "1's" *might* exist. Accordingly, such a written text might be encoded into a binary sequence of "ON" and "OFF" pulses, transmitted in binary form to a receiving station, and there decoded back into the original written text.

In PCM (pulse code modulation) communication system, continuous, time-varying "messages," such as electrical speech signals, are also represented by a series of ON and OFF pulses. In this process, the signal is periodically sampled and binary code words indicative of the amplitude of each of the samples are transmitted. For a thorough exposition of the theory, operation, and advantages of typical PCM systems see, for example, the article "The Philosophy of PCM," by Oliver, Pierce, and Shannon, in volume 36, Proceedings of the IRE, pages 1324 to 1331 (1948); "An Experimental Multichannel PCM System of Toll Quality," by Peterson and Meacham in volume 27, Bell System Technical Journal, pages 1–43 (1948); and "A Mathematical Theory of Communication," by Shannon also in volume 27 of the Bell System Technical Journal, pages 379–423 and 623–656 (1948).

In PCM, the range of possible signal amplitudes is broken up into a finite number of levels or "quantizing steps." The amplitude of each signal sample is then compared with this ladder-like array of levels and all amplitudes falling within any given step are replaced by a single value uniquely characterizing that level. The process of quantization, that is, the representation of a bounded continuum of values by a finite number of discrete values, permits the transmission of a digital signal comprising groups of pulses. Each of the transmitted pulse groups represents a binary number which indicates the particular discrete value nearest to the instantaneous sample amplitude of the continuous signal.

It is a general object of the present invention to translate analog message signals into conventional binary code words in an improved yet simplified manner.

Since, as discussed above, each code "word" transmitted is only an approximation of the actual instantaneous amplitude of the signal, deliberate errors are imparted to the signal giving rise to what is variously known as "quantization noise" or "quantization distortion." This noise is a significant source of PCM signal impairment and, consequently, various methods of reducing its magnitude have been suggested. The first and most obvious of these approaches is to increase the number of levels to provide a finer-grained approximation of the signal. This necessarily involves an increase in the number of digits per code word, however, and accordingly results in an increase in the bandwidth of the transmitted signal. Alternatively, a more complete description of the signal may be provided by increasing the sampling rate—although this approach also suffers the disadvantage of increased bandwidth.

A third and more advantageous method of reducing quantizing noise is known as "companding." According to this scheme, the size of each step is dependent upon its position within the array of steps—the total number of steps remaining unchanged. By providing smaller steps for weaker signals (and consequently larger steps for stronger signals), quantization noise may be significantly decreased without increasing the bandwidth of the transmitted digital signal. A common method for effectively changing the relative size of the steps involves the use of a separate network interposed between the signal source and a linear encoder. Such networks possess nonlinear transfer characteristics such that high-level input signals are compressed and low-level signals are expanded before being fed to the linear encoder. While these networks are quite effective, they are both expensive and space consuming.

It is, therefore, another object of the present invention to achieve companding within the encoder itself, without resorting to separate apparatus.

It has been found that if a logarithmic relationship between the signal amplitude and the size of the quantization levels is employed, companding is particularly effective. According to this preferred scheme, the size of the levels increases logarithmically as signal amplitude increases. In order to achieve the desired logarithmic relationship, many prior art companding arrangements have resorted to piece-wise linear, parabolic, and hyperbolic approximations. Other arangements, though they have been capable of true logarithmic companding, have been found to be both complex and costly.

It is, therefore, a still further object of the present invention to accomplish instantaneous, true logarithmic companding.

The prior art has disclosed that a binary encoder may be constructed wherein a plurality of stages are connected in tandem. In such "stage-by-stage" binary encoding schemes, each of the stages is provided with an analog input, a digit output, and a so-called "residue" output. The residue output from the first stage is connected to supply the analog input signal to the second stage, and so on, and the encoded binary digit symbols appear in parallel at the digit outputs of the several stages. Each of the stages in the encoder is characterized in that the "residue output v. analog input" transfer characteristic possesses a sawtooth shape. The amplitude of the residue output signal varies linearly with the analog input signal until the input signal amplitude reaches a preset threshold level at which time the output signal jumps abruptly to a new level, thereafter once again varying linearly with the input signal. The digit output of each stage receives a voltage indicative of a first symbol whenever the input signal amplitude is less than the threshold level and receives a different voltage representing a second symbol whenever the analog input signal is larger than the threshold level.

In the improved stage-by-stage encoder according to the present invention, the threshold level, rather than being positioned in the middle of the range of input signal amplitudes as it was in prior art encoders, is offset from the mid-range value to provide quantization levels of different sizes. According to another feature of the invention, the slope of the sawtooth-shaped, residue output characteristic above the threshold level is different from the slope below the threshold. The novel stage-by-stage encoding scheme according to the invention makes possible many varieties of instantaneous companding and does not require the use of additional circuitry. True logarithmic companding is made possible by a further development of the present invention wherein the threshold levels in the various stages are judiciously positioned relative to the mid-range value of the input signal in accordance with a predetermined relationship.

A novel stage circuit is employed to accomplish the encoding scheme described above. According to this aspect of the invention, an amplifier is provided with at least one unidirectionally conducting feedback path for providing different amplifier gains (and hence different slopes in the transfer characteristic) for input signals above and below the aforementioned threshold value. Still another feature of this novel circuit resides in the use of means for effectively adding a fixed electrical quantity to the residue output signal whenever the input signal exceeds the threshold value.

These and other features, objects and advantages of the invention will become more apparent following a consideration of the following detailed description of a specific embodiment of the invention. In the drawings, FIGS. 1 through 7 illustrate the operation of the "stage-by-stage" encoding arrangement on a block-diagram, system basis while the remaining FIGURES 8 through 13, relate to the novel encoding scheme contemplated by the present invention. More specifically, FIG. 1 depicts in simple block form the input and output connections of a single encoding stage of the kind employed in the present invention;

Figure 3:
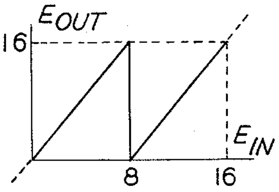
FIG. 3 illustrates the residue output characteristic of the stage shown in FIG. 1 which allows the encoder to convert analog signals into conventional binary code words.
Figure 5:
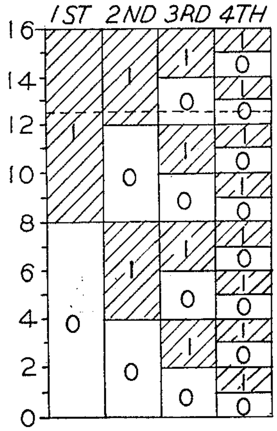
Figure 6:
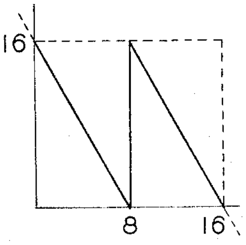
Figure 7:
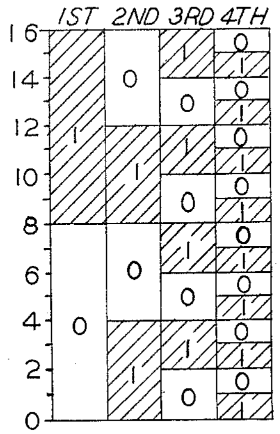
Figure 8:
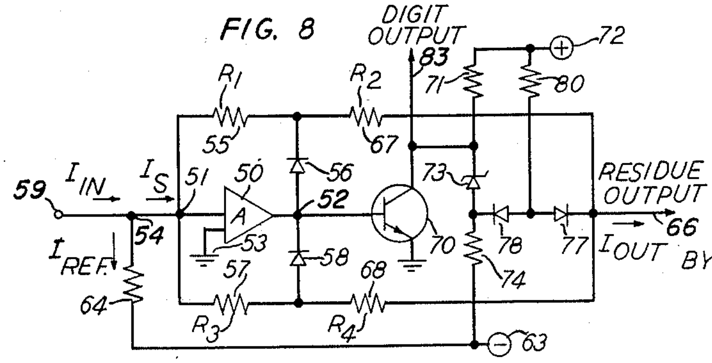
Figure 9:
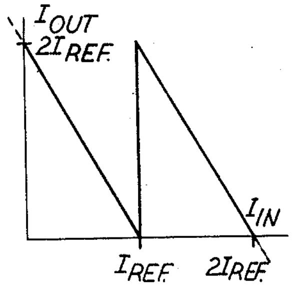
Figure 12:
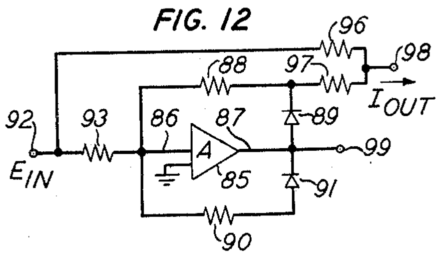
Figure 13:
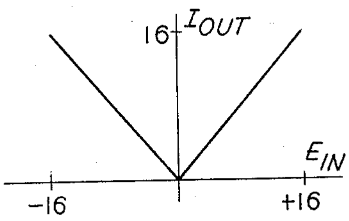

FIG. 5 graphically illustrates the conventional binary code representation of signal amplitudes achieved when the stage-by-stage encoder uses the residue output characteristic of FIG. 3;

FIG. 6 shows another form of residue output characteristic which may be used for an encoder according to the invention;

FIG. 7 depicts another variation of the conventional binary code which is attained when the transfer characteristic of FIG. 5 is used in the encoder;

FIG. 8 is a schematic drawing of the novel circuitry employed in an encoding stage as contemplated by the present invention;

FIG. 9 illustrates the operation of the circuit shown in FIG. 6;

FIG. 10 illustrates the manner in which compression as accomplished by the present invention reduces quantization noise;

FIG. 11 depicts the scheme by which the present invention achieves pure logarithmic compression within the encoder;

FIG. 12 is a schematic drawing of a "polarity extractor" stage which may be employed to advantage in an encoder as contemplated by the present invention; and FIG. 13 illustrates the transfer characteristic of the polarity extractor stage shown in FIG. 9.

Figure 1:
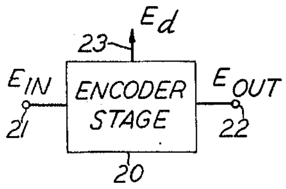

The present invention employs the "stage-by-stage" encoding method. In the drawings, FIG. 1 illustrates the input and output connections of a single stage 20 of the type used in the stage-by-stage encoder. Stage 20 is provided with an input conductor 21, an analog output conductor 22 and a digit output conductor 23. Hereinafter, the voltage applied to the input conductor 21 will be designated $E_{in}$, the voltage applied to the digit output conductor 23 will be designated $E_d$ and the voltage delivered to the residue output 22 will be termed $E_{out}$. For purposes of illustrating the operation of the stage-by-stage encoder, it will be assumed that the input voltage $E_{in}$ will always have an amplitude within the range of 0 to +16 volts.

Figure 2:
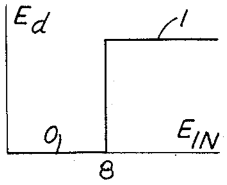
FIG. 2 is a graphical representation of the digit output transfer characteristic of the stage shown in FIG. 1.

FIG. 2 of the drawings illustrates the relationship between the voltage $E_{in}$ applied to input conductor 21 and the voltage $E_d$ appearing at digit output 23. It will be noted that a voltage indicative of the digit symbol "0" is delivered to output 23 whenever $E_{in}$ is less than the mid-range threshold value of 8 volts. A second voltage representing the digit symbol "1" is delivered to digit output 23 whenever $E_{in}$ is greater than the 8-volt threshold value.

FIG. 3 of the drawings shows the transfer characteristic between analog input 21 and residue output 22. A transfer characteristic having a "saw-toothed" shape of the type shown in FIG. 3 allows the stage-by-stage encoder to convert the instantaneous amplitude of the analog input signal into code words having digits arranged in accordance with the conventional binary code. Note that, in the characteristic shown in FIG. 3, whenever $E_{in}$ is less than 8, $E_{out}$ equals $2E_{in}$ and whenever $E_{in}$ is greater than 8, $E_{out}$ equals $2(E_{in}-8)$.

Figure 4:
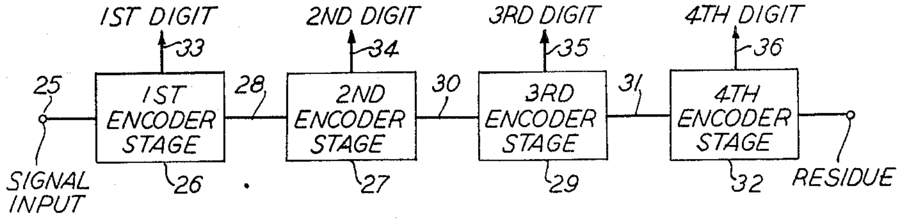
FIG. 4 shows a stage-by-stage encoder capable of translating an analog signal into 4-digit code words.

FIG. 4 shows a 4-digit binary encoder employing four encoding stages connected in tandem. Each of these stages is provided with input and output connections as shown in FIG. 1 and each possesses the transfer characteristics shown in FIGS. 2 and 3. The 4-digit encoder is provided with a signal input terminal 25 which comprises the analog input to a first encoder stage 26. The residue output from stage 26 is directly connected to the analog input of a second encoder stage 27 by conductor 28. Similarly, the residue output of the second stage 27 is connected to the analog input of a third stage 29 by conductor 30. Conductor 31 connects the residue output of the third stage 29 to the analog input of a fourth stage 32. Stage 32 is provided with a residue output terminal 33. Stages 26, 27, 29 and 32 are provided with digit outputs 33, 34, 35 and 36, respectively.

In operation, an analog message signal from an available source is applied to signal input terminal 25. A 4-digit binary representation of the instantaneous amplitude of this signal appears "in parallel" at the four digit outputs 33 through 36. A final residue output signal, which may be employed in the generation of still further digits for greater accuracy, appears at the residue output terminal.

To illustrate the operation of the stage-by-stage encoder shown in FIG. 4, assume that the amplitude of the message signal applied to signal input terminal 25 is 12.6 volts. From the graph of FIG. 2, it will be apparent that the first digit output conductor 33 receives a signal representative of the digit symbol "1" since the input to stage 26 is greater than the 8-volt threshold value. From FIG. 3 it may be seen that the residue signal from stage 26 which appears on conductor 28 is equal to $2(12.6-8)=9.2$ volts. This voltage is applied to the input of stage 27 and results in a voltage representing the digit symbol "1" being applied to digit output conductor 34 and a residue output of $2(9.2-8)=2.4$ volts being applied to conductor 30. Accordingly, digit output conductor 35 receives a "0" since the input to stage 29 is less than 8 volts. The output of stage 29 receives a voltage equal to $2(2.4)=4.8$ volts. This 4.8 volt residue signal is applied to the input of stage 32 resulting in the fourth digit being a "0" and the residue signal delivered to terminal 33 being equal to $2(4.8)=9.6$ volts. It will be seen that the code word "1100" appears in parallel form at the 4-digit output terminals 33 through 36. The 9.6 volt residue signal could be applied to still another stage to generate a fifth digit, and so on, such that any desired number of digits might be obtained depending upon the degree of accuracy required.

FIG. 5 illustrates the manner in which a 4-digit code word of the type generated by the encoder of FIG. 4 represents the instantaneous amplitude of the analog input signal. As before the input message signal is assumed to fall at all times within a range of from 0 to +16 volts. The 4-digit binary representation of any given amplitude within this range may be obtained from the diagram of FIG. 5. To determine the nature of the binary representation of any number between 0 and 16, simply find the decimal number on the scale at the left and then sight across the diagram from left to right reading in the four digits. Thus, the conventional binary representation of the number 12.6 is seen to be the code word "1100" as shown by the broken line in FIG. 5.

Another variation of the stage-by-stage encoding system employs a transfer characteristic shown in FIG. 6 of the drawings. As before, the transfer characteristic has a sawtooth shape and comprises two sloped lines separated by a discontinuity. With the second form of residue transfer characteristic as shown in FIG. 6, however, the lines have a negative slope. The residue characteristic of FIG. 6 allows conversion into a code representation which is somewhat different from that of FIG. 5. This variation of the conventional binary code, which is illustrated by the graph of FIG. 7, may be distinguished from that of FIG. 5 in that the 0's and 1's are interchanged in the even numbered columns.

The present invention provides improved stage circuitry for realizing the stage-by-stage encoding process described above. As shown in FIG. 8, the stage is provided with an amplifier 50 having an input 51, an output 52 and a ground connection 53. Input 51 is directly connected to a summing node 54. A first resistance 55 and a first diode 56 are connected in series to form a feedback path between input 51 and output 52, diode 56 being poled in the direction of positive current flow from output 52 to input 51. A similar feedback path comprising a second resistance 57 and a diode 58 is also provided between output 52 and input 51, diode 58 being poled to conduct positive current from input 51 to output 52. The stage is provided with an input terminal 59 which is directly connected to the summing node 54.

The inverting amplifier 50 is characterized in that it possesses both a high current gain and a high voltage gain. Furthermore, amplifier 50 is a differential amplifier which delivers a voltage to output 52 having a magnitude equal to the extremely high negative gain of the amplifier times the difference voltage existing between the grounded connection 53 and input 51. Thus, when a finite voltage in the usual operating range appears at output terminal 52, the difference between the voltage at input 51 and ground is negligible. Accordingly, input 51 may be considered to be at substantially ground potential throughout the operation of the network. Similarly, when the output current delivered to conductor 52 is finite, the input current through conductor 51 is very small. Therefore, substantially all of the current $I_s$ from the summing node 54 will, depending on its polarity, flow through one of the two resistances 55 or 57. If current $I_s$ is positive as shown (output conductor 52 then being negative), substantially all of the input current will flow through resistance 57. If $I_s$ is negative, substantially all of the current will flow through resistance 55. The voltages across resistances 57 and 55 accordingly exhibit linear relationships with the current $I_s$ from the summing node 54.

The voltage existing at output 52 equals the voltage drop across one of the resistances 55 or 57 plus the small forward voltage drop across the conducting diode. For conventional silicon diodes these forward voltage drops are on the order of .7 volt. For input currents very close to zero, the output voltage delivered to conductor 52 is of insufficient magnitude to forward bias either diode. Since both of the two negative feedback paths are nonconducting, the high gain of the amplifier causes the transfer characteristic between input 51 and output 52 to exhibit a steep "jump" near $I_s=0$. The magnitude of this jump is equal to the sum of the forward voltage drops of the two diodes.

In addition to that portion of the stage circuitry discussed above, a negative voltage source 63 is connected to the summing node 54 by means of resistance 64. This arrangement provides a flow of constant current ($I_{ref.}$) out of the summing node 54.

The encoding stage is provided with an output conductor 66. The junction of resistance 55 and diode 56 is connected to output conductor 66 by means of resistance 67. The junction of resistance 57 and diode 58 is connected to output conductor 66 by resistance 68.

The encoding stage is also provided with a transistor switching network which is responsive to the voltage which appears at the junction of the two diodes 56 and 58. The purpose of this switching network is to provide a digit output as well as to introduce the discontinuity in the "analog-input vs. residue-output" transfer characteristic as shown in FIGS. 3 and 6 of the drawings. The switching network includes a transistor 70 which is provided with base, emitter and collector electrodes. The base electrode is directly connected to the output 52 from the amplifier 50, the emitter electrode is grounded, and the collector electrode is connected by means of a resistance 71 to a positive voltage supply 72. A circuit path comprising the series combination of a Zener diode 73 and a resistance 74 is connected between the collector terminal of transistor 70 and the negative voltage source 63. Two diodes, 77 and 78, are connected between output conductor 66 and the junction of Zener diode 73 and resistance 74. The positive voltage source 72 is connected to the junction of the diodes 77 and 78 by means of resistance 80. A direct connection to the collector of transistor 70 provides the digit output conductor 83 for the stage.

The circuit pictured in FIG. 8 exhibits the $I_{in}$ vs. $I_{out}$ transfer characteristic shown in FIG. 9. Note that $I_{in}$ is a positive current flowing into the summing node 54 throughout the operating range of the encoding stage. Whenever $I_{in}$ is less than the constant current $I_{ref.}$, the net current $I_s$ flowing toward input 51 is negative. With a net negative signal into the amplifier, the output voltage appearing on conductor 52 will be positive by at least 0.7 volt or so by virtue of the feedback connection and the drop across the upper feedback diode. This voltage is applied to the base of the transistor 70 in the output circuit and in turn effectively grounds the cathode of Zener diode 73 and back-biases diode 77 to insure that no current will be allowed to flow from source 72 through resistance 80 and diode 77 to conductor 66. Whenever the current $I_s$ is negative, the magnitude of the output current $I_{out}$ is given by the relation:

$$I_{out}=\frac{(I_{ref.}-I_{in})}{R_2}R_1 I_{in}<I_{ref.}$$

where $R_1$ is the resistance of resistor 55 and $R_2$ is the resistance of resistor 67.

Whenever $I_{in}$ is greater than $I_{ref.}$, there is a net positive input signal to the amplifier 50. Consequently, conductor 52 is negative (by at least the 0.7 volt forward drop across diode 58) and transistor 70 is turned off. Under these conditions, the cathode of diode 78 becomes positive and only diode 77 is forward biased. Beside the signal contribution flowing through resistance 68, output conductor 66 also receives a fixed additional current which flows through the resistance 80. This current is adjusted to be equal to $$\left[\frac{R_1}{R_2}I_{ref.}\right]$$

The output current $I_{out}$ is then given by the relation:

$$I_{out}=\frac{R_1}{R_2}I_{ref.}-\frac{(I_{in}-I_{ref.})}{R_4}R_3$$

where $R_3$ is the resistance of resistor 57 and $R_4$ is the resistance of resistor 68. To obtain the transfer characteristic pictured in FIG. 9, the values of the above resistances are adjusted such that:

$$\frac{R_1}{R_2}=\frac{R_3}{R_4}=2$$

It will be noted that the transfer characteristics of FIGS. 6 and 9 are substantially identical. Accordingly, stages of the type shown in FIG. 8 may be connected in tandem to provide translation of analog signals into a code of the character shown by FIG. 7. Alternatively, the encoding stage of FIG. 8 may be modified by the use of an additional negative gain amplifier, either in the input or the output circuit of the stage, to provide a transfer characteristic as shown in FIG. 3. The more conventional binary code may also be obtained by merely employing means for interchanging the 0 and 1 symbol indications in alternate stages.

The discontinuous nature of the residue characteristic introduces a problem: if the input signal to any stage should happen to be near $I_{ref.}$, and should drift past the decision point causing the output to make a change over the full range, all the following stages would have to change states. The "settling time" under these conditions may be quite long. To avoid this difficulty, binary systems may be clocked, so that a decision by the stage in question is irrevocable. Alternatively, a measure of hysteresis or "backlash" may be introduced which is greater in amount than the greatest expected input variation during the sampling period. This hysteresis may be introduced by connecting a resistor from the junction of diodes 73 and 78 to the input summing node 54. The size of the resistor may be selected to provide any appropriate degree of hysteresis current—such as ¼ step.

The circuitry shown in FIG. 8 may be readily adapted to provide companding in accordance with the invention. As long as transfer characteristics having a mid-range threshold as discussed above are employed, all of the quantized levels are of the same size. By modifying element values within the encoding stage of FIG. 8, however, the shape of the transfer characteristic may be altered in accordance with the invention to provide companding.

Figure 10A:
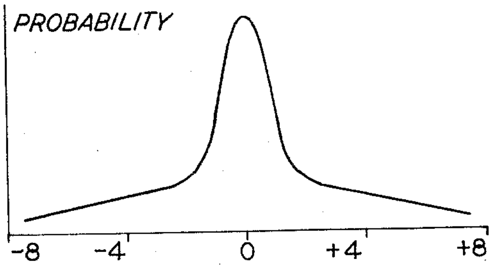
Figure 10B:
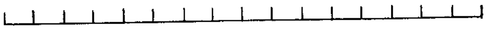

FIG. 10 of the drawings is included to briefly illustrate the nature of companding and the manner in which it reduces quantization noise. If normal human speed at constant volume were to be converted into an electrical signal (by means of a telephone handset, for example) such that the signal was centered about some average or "zero" value and if the instantaneous amplitude of the resulting signal were repeatedly measured, it would be found that most of the measured values would be in the neighborhood of zero. This is illustrated by the probability curve of FIG. 10A. More detailed data on speech probabilities is to be found in an article entitled "An Experimental Study of Speech Wave Probability Distribution" by W. B. Davenport, Jr. which appeared in volume 24, No. 4 of The Journal of the Acoustical Society of America, July 1952. FIG. 10B shows the usual method of breaking up the range of possible signal amplitudes into levels of equal size. These levels are then used as the basis for a binary description of the speech signals.

Figure 10C:
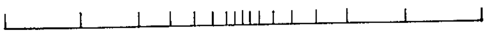

As discussed earlier, the process of quantization is a process of approximation and accordingly gives rise to errors. In PCM, these errors cause noise whose severity is related to both the number and the size of the errors. The principle of companding is based on the realization that the total noise may be minimized by providing finer-grained approximations for those ampltiudes where the signal is most likely to exist—and rougher approximations for those amplitudes where the signal exists only seldomly. As may be seen from the probability distribution shown in FIG. 10A, the amplitude of a speech signal is much more likely to be in the neighborhood of zero than near maximum amplitude. Consequently, the provision of more quantization levels around the zero value than for large amplitudes decreases the total noise. FIG. 10C shows such nonuniform quantization wherein the size of the levels increases in relation to their distance from the signal's average value. For a detailed treatise on the theory of companding, see the article "Instantaneous Companding of Quantized Signals" by Bernard Smith which appeared in volume 36 of the Bell System Technical Journal, pages 653 to 709.

Figure 11A:
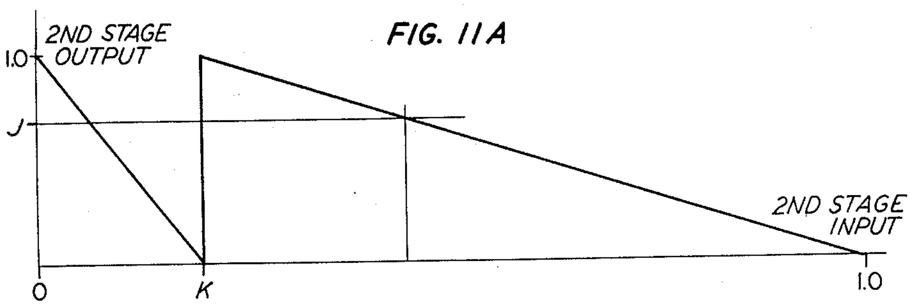
Figure 11B:
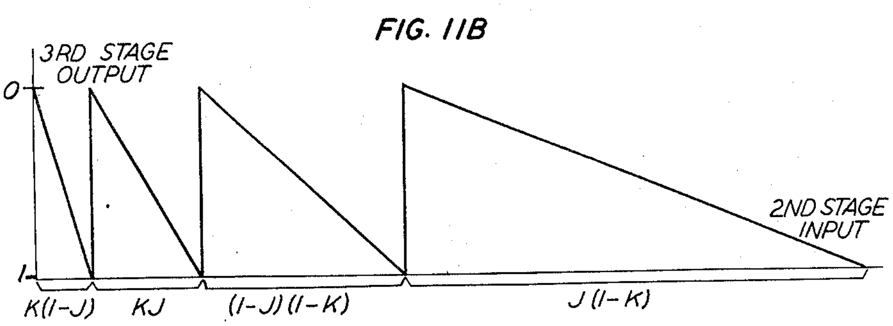

As contemplated by the present invention, companding may be realized in a stage-by-stage encoder by altering the transfer characteristics of each stage as shown in FIG. 11A. Levels are made to be of different size merely by moving the decision level in each stage and altering the two adjacent slopes such that they still cover the proper output range. Assume that the signal to be encoded has been first rectified and that the first digit generated indicates its polarity (circuitry for performing this function will be discussed in conjunction with FIGS. 12 and 13). The rectified signal from the "polarity extractor" is then applied to the second stage of the encoder. This second stage has a transfer characteristic of the type shown in FIG. 11A. The output from the second stage is then fed into the input of the third stage, and so on. The only difference between the encoder with companding and the encoder shown in FIG. 4 (with the exception that the first stage is now a polarity extractor) is in the altered transfer characteristics of the stages. FIG. 11B shows the transfer characteristic, not of a single stage, but of the second and third stages in tandem.

Note that the decision level of the first stage was set at the value "K" and that the graph is normalized to a unit full-range value. For all signals having an amplitude less than K, therefore, the second digit will be a zero. The transfer characteristic of the third stage is like that of the second—except the decision level is set at the value "J." It follows then that the length of the smallest quantized level shown in FIG. 11B is equal to $K(1-J)$, the length of the next, KJ, and so on. Since it is desirable that the sizes of the quantizing intervals increase in size as the intervals become more distant from the zero value, K should be made less than ½ (where the full-scale input is normalized to be equal to 1.0) and $(1-J)$ should be less than ½ but larger than K. For the increases in size to be truly logarithmic, the length of each level should be related to the next larger one by the same ratio. Therefore:

$$\frac{K(1-J)}{KJ}=\frac{KJ}{(1-J)(1-K)}$$

which, when simplified, reveals that:

$$J=\frac{(1-K)^{1/2}}{(1-K)^{1/2}+K^{1/2}}$$

Thus, to obtain true logarithmic companding, it is necessary to first select the decision level of the second stage (that is, the stage following the polarity extractor) and then determine the decision levels for each succeeding stage one at a time using the relationship above.

In the circuit shown in FIG. 8, the position of the decision level may be altered by varying $I_{ref.}$. $I_{ref.}$ should have a magnitude equal to K times the maximum input current $I_{in}$, where K is the decision level as depicted in FIG. 11A. The slopes of the transfer characteristics may also be altered so that the proper residue voltage is delivered to the stage output. It is a particularly advantageous feature of the embodiment of the invention shown in FIG. 8 that the two halves of the transfer characteristic may be adjusted independently. To provide the proper slope for the lower half of the transfer characteristic, the values or resistances 55 and 67 should be adjusted such that:

$$\frac{R_1}{R_2}=\frac{1}{K}$$

where K is the decision level for a given stage. The values of resistances 57 and 68 should be adjusted such that:

$$\frac{R_3}{R_4}=\frac{1}{1-K}$$

By way of example, if 20 db of companding is used, the decision level of the second stage (the first stage following the polarity extractor) should be at 0.144 of full-scale. The ratios of feedback to coupling resistors is set such that the residue output spans the full output signal range as shown in FIG. 11A. The ratio of $R_1$ to $R_2$ would be 6.93 and the ratio of $R_3$ and $R_4$ would be 1.17. A similar computation for the remaining stages of a 4-stage encoder yields the following table for 20 db of companding:

| Stage | $R_1/R_2$ | $R_3/R_4$ | $I_{ref.}$ |
|---|---|---|---|
| 1 | Polarity extractor stage | | |
| 2 | 6.93 | 1.17 | 0.144 |
| 3 | 1.41 | 3.43 | .711 |
| 4 | 2.56 | 1.66 | 0.394 |

The reference current $I_{ref.}$ in the table is normalized to a unit full scale input range.

The companding law is naturally logarithmic. The second stage introduces two decision levels and establishes the degree of compression. The third stage introduces four decision levels at input signal values which, as has been shown, are predetermined by the degree of compression. The *n*th stage introduces $2^{n-1}$ decision levels, each of which is intermediate between two previously established decision levels. It may be noted that the relative reference signal approaches 50% of the full scale value for the later stages of the coder.

FIG. 12 of the drawings shows a "polarity extractor" stage which may be employed to drive a series of other stages of the type pictured in FIG. 8. The polarity extractor includes an amplifier 85 having an input 86 and an output 87. A first feedback path comprising resistor 88 and diode 89 in series is connected between input 86 and output 87. A similar path made up of resistor 90 and diode 91 is also connected between input 86 and output 87. A conductor 92 serves as the input to the polarity extractor. Resistor 93 connects stage input 92 to amplifier input 86. The series combination of resistors 96 and 97 connect the junction of resistor 88 and diode 89 to the input conductor 92. The junction of resistors 96 and 97 provides the analog output 98 from the stage while a digit output 99 is directly connected to amplifier output 87.

The polarity extractor stage has a transfer characteristic as shown in FIG. 13. For negative input signals, amplifier 85 delivers a positive voltage to output 87 and hence to output 98. For positive input signals, amplifier output 87 is negative and diode 89 is back-biased. Output 98 then receives a positive signal related directly to the magnitude of the positive input signal. Resistor 90 and diode 91 are included to prevent the magnitude of voltage at output 87 from being excessive whenever positive input signals are applied to amplifier 86.

Although the invention has been described largely with reference to certain specific embodiments, it will be appreciated that these embodiments are in part only illustrative and that the invention may be embodied equally well in various other forms.

What is claimed is:

1. In combination, a source of a time-varying analog signal having an amplitude which at all times is less then $+E_{max.}$ and greater than $-E_{max.}$, means responsive to said analog signal for generating a first digit in a code group, said first digit being a first symbol whenever said analog signal is positive and being a second symbol whenever said analog signal is negative, means for rectifying said analog signal to produce a second signal, and means responsive to said second signal for generating a second digit in said code group, said second digit being a first symbol whenever said second signal is less than K and being a second symbol whenever said second signal is greater than K, the quantity K being substantially less than the magnitude of $$\frac{E_{max.}}{2}$$

2. In combination, a source of a first signal $E_1$, means responsive to said lrst signal for generating a first digit in a code group said first digit being a first symbol whenever $E_1$ is negative and being a second digit whenever $E_1$ is positive, means for rectifying said first signal to produce a second signal $E_2$ having a maximum amplitude of $E_{max.}$, means responsive to said second signal for generating a second digit in said code group, said second digit being a first symbol whenever $E_2$ is less than a threshold value K and being a second symbol whenever $E_2$ is greater than said value K, K being substantially less than $$\frac{E_{max.}}{2}$$

and means responsive to said second signal for generating a third signal $E_3$ related to said second signal by the relation $$E_3=\frac{E_2}{K}$$

whenever $E_2$ is less than K and by the relation $$E_3=\frac{E_2-K}{(1-K)}$$

whenever $E_2$ is greater than K.

3. A PCM encoder which comprises, in combination, at least first and second networks each having an analog input, an analog output and a digit output, circuit means for connecting said networks in tandem by connecting the analog output of said first network to the analog input of said second network, means within each of said networks for delivering a first symbol to said digit output whenever the signal applied to the network analog input is greater than a predetermined decision level and delivering a second symbol to said digit output whenever the signal applied to the network analog input is less than said predetermined decision level, said decision level in said first network being K times the maximum input signal to said first stage, said decision level in said second network being J times the maximum input signal to said second stage, and said quantities K and J being unequal and both substantially less than unity.

4. An encoder as set forth in claim 3 further characterized in that said quantities K and J are related by the relation:

$$J=\frac{K^{1/2}}{K^{1/2}+(1-K)^{1/2}}$$

5. An encoder as set forth in claim 1 further characterized in that said quantities K and J are related by the relation:

$$J=1-\frac{K^{1/2}}{K^{1/2}+(1-K)^{1/2}}$$

6. In combination, a source of an analog message signal, an amplifier, input and output circuits for said amplifier, first and second circuit paths connected in feedback relation between said input and output circuits, each of said paths comprising the series combination of a resistor and a diode, means for applying said message signal to said input circuit, means for obtaining a first signal from the junction of said resistor and said diode in said first path, means for obtaining a second signal from the junction of said resistor and said diode in said second path, threshold means connected to said output circuit for developing a third signal of constant magnitude whenever said message signal exceeds a predetermined amplitude, and means for combining said first, second and third signals to form an output signal.

7. In combination, an amplifier having an input and an output, a source of signals connected to said input, a first feedback path including a first diode connected between said input and said output, a second feedback path including a second diode connected between said input and said output, said first and said second diodes being poled such that only one of said feedback paths is conductive for any input signal polarity, a transistor having a base electrode and a transconductive path, circuit means connecting said base electrode to the output of said amplifier, means including the transconductive path of said transistor for generating a fixed electrical quantity whenever the signal for said source exceeds a predetermined magnitude, means for deriving a first output signal from said first feedback path, means for deriving a second output signal from said second feedback path, and means for combining first and said second output signals with said fixed electrical quantity to form a final output signal.

8. A combination as set forth in claim 7 including digit output means connected to said transistor for generating a first digit symbol whenever said transistor is conductive and for generating a second digit symbol whenever said transistor is nonconductive.

9. Apparatus for encoding a signal amplitude into a representative binary code word made up of at least a first and a second binary digit which comprises, in combination:

means for comparing said signal amplitude with a first decision amplitude to generate said first digit, said first digit being a first symbol when said signal amplitude is less than said first decision amplitude and being a second symbol when said signal amplitude is greater than said first decision amplitude, means for amplifying said signal amplitude by a first factor when said first digit is said first symbol and by a second factor when said first digit is said second symbol, said first and said second factors having the same sign but substantially different magnitudes, means for adding to signal thus amplified a first reference signal when said first digit is said first symbol and a second reference signal when said first digit is said second symbol, said first and said second reference signals having substantially different magnitudes, and means for comparing the sum of said addition with a second decision level to generate a second digit in said code word, said second digit being one symbol when said sum is greater than said second decision amplitude and being another symbol when said sum is less than said second decision amplitude.

10. Apparatus for encoding a signal amplitude $E_{in}$ into an $n$-digit code word capable of representing any signal amplitude within a range between a minimum amplitude $E_{min.}$ and a maximum amplitude $E_{max.}$, said range being divisible into $2^n$ steps of different sizes, each of said steps being represented by a particular one of the $2^n$ possible code words, said apparatus comprising, in combination, means for comparing said signal amplitude $E_{in}$ with a first reference amplitude and generating a first digit in said code word, said first digit being a first symbol when $E_{in}$ is less than said first reference amplitude and being a second symbol when $E_{in}$ is greater than said first reference amplitude, said first reference amplitude being substantially offset from the midrange amplitude $$\frac{E_{max.}-E_{min.}}{2}$$

means for operating on said signal amplitude $E_{in}$ to produce an output signal having an amplitude $E_{out}$ having the value $$AE_{in}+C_1$$

whenever said first digit is said first symbol and having the value $$BE_{in}+C_2$$

whenever said first digit is said second symbol, the quantities A and B being constants having the same sign but substantially different magnitudes and the quantities $C_1$ and $C_2$ being unequal constants, and means for comparing the amplitude $E_{out}$ with a second reference amplitude and generating a second digit in said code word, said second digit being a first symbol when $E_{out}$ is less than said second reference amplitude and being a second symbol when $E_{out}$ is greater than said second reference amplitude.

References Cited in the file of this patent

UNITED STATES PATENTS 2,660,618 Aigrain ---------------- Nov. 24, 1953